United States Patent [19]

Karl et al.

[11] 4,002,839
[45] Jan. 11, 1977

[54] METHOD AND APPARATUS FOR THE MUTUAL SYNCHRONIZATION OF THE EXCHANGE CLOCK PULSE OSCILLATORS IN SWITCHING SYSTEMS OF A PCM TIME DIVISION MULTIPLEX TELECOMMUNICATION NETWORK

[76] Inventors: Otto Karl, Forstenrieder Allee 78/III; Reiner Binz, Rohrauerstrasse 58, both of, 8000 Munich 71, Germany

[22] Filed: May 27, 1975

[21] Appl. No.: 581,376

[30] Foreign Application Priority Data

May 27, 1974 Germany .................. 2425604

[52] U.S. Cl. .................................... 179/15 BS
[51] Int. Cl.² .................................. H04J 3/06
[58] Field of Search ............ 179/15 BS; 178/69.5 R

[56] References Cited
UNITED STATES PATENTS

| | | | |
|---|---|---|---|
| 3,560,869 | 2/1971 | Miller | 179/15 BS X |
| 3,622,993 | 11/1971 | Duerdoth | 179/15 BS X |
| 3,651,408 | 3/1972 | Miller | 179/15 BS X |
| 3,869,579 | 3/1975 | Karl | 179/15 BS |

Primary Examiner—Thomas W. Brown

[57] ABSTRACT

A method and apparatus for synchronizing clock oscillators in each of the exchange installations (network nodes) of a PCM/TDM telecommunication network is described. A frequency divider in each network node receives pulses from a clock generator at that node, and frequency dividers are provided for receiving clock pulses from other exchangers on incoming trunks. The incoming trunk frequency dividers are caused to operate with a phase displacement of 180° relative to the clock generator in the exchange. The outputs from the incoming trunk frequency dividers and the exchange clock frequency divider are coupled to phase discriminators. The phase discriminator outputs are coupled through a sum or mean value producing element to produce a control signal for adjusting the frequency of the exchange clock oscillator. Reference phase regeneration is initiated as a result of frequency drift from the oscillator no-load frequency, which drift exceeds a predetermined value.

10 Claims, 1 Drawing Figure

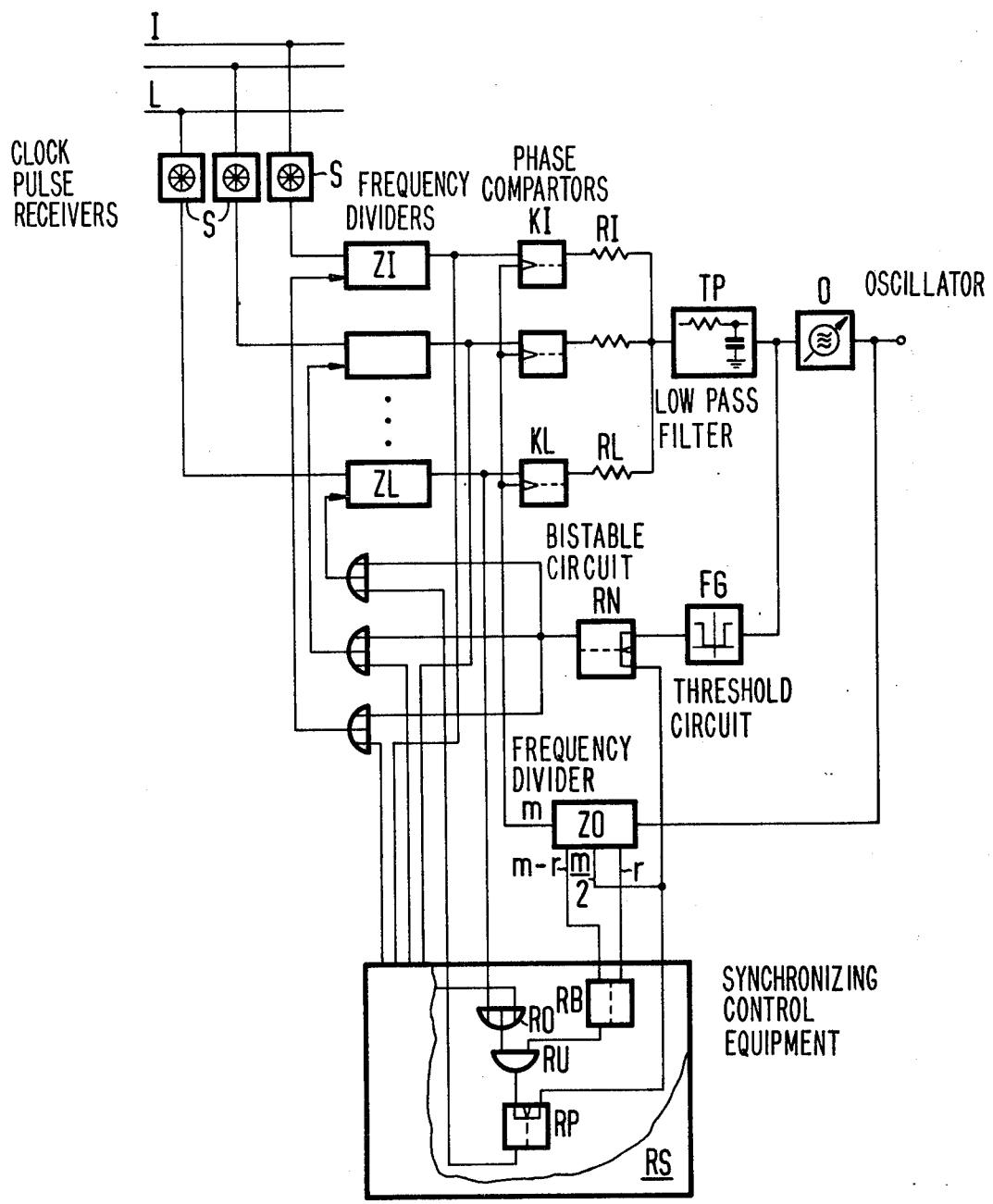

METHOD AND APPARATUS FOR THE MUTUAL SYNCHRONIZATION OF THE EXCHANGE CLOCK PULSE OSCILLATORS IN SWITCHING SYSTEMS OF A PCM TIME DIVISION MULTIPLEX TELECOMMUNICATION NETWORK

BACKGROUND OF THE INVENTION

In conventional telecommunication switching centers, more particularly telephone switching centers, analog signals continuous in time are transmitted in transmission channels separated physically from one another. More recent telephone switching centers do not utilize the space-division, but instead use the time-division multiplex (TDM) principle, whereby analog signals discontinuous in time are transmitted. Moreover, wider interest is now developing in telephone switching systems wherein digital signals (likewise discontinuous in time) are transmitted. In this regard, pulse-code modulation (PCM) has gained particular importance wherein at a sequence of time instants the instantaneous values of the amplitudes of the voice signals are represented by binary words which are then transmitted.

The primary object of a PCM/TDM switching center lies in switching through the binary words appearing over the PCM receive TDM trunks leading to the switching center in time slots particularly allocated to the individual connections. In accordance with the 4-wire operation of the PCM/TDM trunks coming into the PCM/TDM switching center or emanating therefrom there is always involved switching on a 4-wire basis, i.e., during switching both directions of transmission must be considered separately. To achieve this, the same time slot within the pulse frame derived from the exchange pulse frame of the relevant switching center at the sending end is normally used for the transmission of binary words during a call over a PCM/TDM trunk switched on a 4-wire basis and connected to such a switching center (cf. Proc. IEE 111 (1964) 12, 1976–1980, 1976, right-hand column, middle).

A prerequisite for correct switching in a PCM/TDM switching center is that the binary words to be transmitted be timely available for through-connection. This requirement is not met from the outset since, as a rule, the individual PCM/TDM trunks leading to a PCM/TDM switching center of a PCM telecommunication network have different delay times which, furthermore, are subject to temperature-dependent variations. Therefore, the bit clock pulses of the individual PCM/TDM switching centers will not coincide with one another without special provision.

To provide for the above prerequisite, three problems must basically be solved: Small phase variations ("jitters") occurring on the transmission circuit must be eliminated; the bit rate differences between signals transmitted over differently directed PCM/TDM trunks must be compensated; and, a pulse frame compensation must be performed ("isochronous mode") in order that all time slots having the same ordinal number coincide with one another with respect to time within the pulse frame under consideration in the incoming and outgoing directions. Thus the switching of connecting paths for both directions of transmission may take place simultaneously.

The first problem can be solved by means of a clock signal receiver, e.g., in the form of an oscillatory circuit excited by the transmitted bits determining the clock pulse rate of the bits regenerated therewith (Proc. IEE 113 (1966)9, 1420–1428, 1422; Reports on Telephone Engineering, Siemens A. G., 5 (1969)1, 48–59, 51).

The last mentioned problem can be solved by inserting approximately proportioned delay lines into the individual receive PCM/TDM trunks leading to the individual PCM/TDM switching centers, through which the transit time delay on the relevant PC/TDM trunk is extended to a whole multiple of the frame period of the information bits. Thus, the pulse frames on all the PCM receive TDM trunks leading to the relevant PCM/TDM switching center coincide with one another with respect to time as well as with the pulse frames of all the transmit PCM/TDM trunks emanating from said switching center, as provided by the exchange pulse frame of the relevant PCM/TDM switching center (of. BSTJ, XXXVIII (1959)4, 909–932, 922; Proc. IEE, 111(1964)12, 1976–1980, 1976, right-hand column, above; Proc. IEE, 113 (1966)9, 1420–1428, 1421, top of column 1; Reports on Telephone Engineering 5 (1969)1, 48–59, 52, 53). In connection with the above frame compensation, a compensation of temperature-dependent transit-time delay variations may be carried out simultaneously (cf. Proc. IEE, 113 (1966)9, 1420–1428, 1421, right-hand column; Reports on Telephone Engineering 5 (1969)1, 48–59, 53).

Various approaches are known for compensating for bit rate differences (cf. Proc. IEE, 113, (1966)9, 1420–1428, 1421; Reports on Telephone Engineering 5 (1969)1, 48–59, 51).

In the case of the asynchronous (heterochronous) mode, each PCM/TDM switching center has its own independent clock generator, and each receive TDM trunk ends in what is known as a pulse-frame storage, whose storage capacity corresponds to the number of bits per pulse frame. The binary words received are retained long enough in the storage to fit into the pulse frame of the PCM/TDM switching center concerned (the pulse frame storage performs at the same time the pulse frame compensation referenced above).

In the quasisynchronous (dummy bit) mode, the PCM/TDM switching centers of a PCM telecommunication network have their own independent clock generators, but the information bit rate, i.e., the mean number of information-carrying bits per second, is made equal for all PCM/TDM switching centers by compensating for the difference between the bit clock rates of the individual PCM/TDM switching centers and the common information bit rate by inserting bits without information ("dummy bits").

In the servosynchronous (homochronous, master-slave) mode, a common clock generator determines the bit rate of the individual PCM/TDM switching centers of a PCM telecommunication network.

Finally, in the autosynchronous mode, the individual PCM/TDM switching centers have individual clock generators which, however, are not independent of one another, but synchronize one another, for example, according to what as known as the phase-averaging principle.

As generally known, in the individual switching centers of a PCM telecommunication network, phase discriminators allocated to the individual lines are assigned to the incoming TDM trunks. These phase discriminators are energized at their inputs by a pulse train corresponding to the respective line bit clock pulse and by a pulse train corresponding to the exchange bit clock pulse of the switching center concerned. The phase discriminator output signals corresponding to the phase shift between the line clock pulse and exchange clock pulse, combined over a sum or mean value producing element, form the control signal for the frequency control of the exchange clock pulse oscillator. In this regard, the phase shifts may be caused by different clock frequencies of the clock oscillators provided in the individual switching centers of the telecommunication network and/or by fluctuations in the line-delay times.

A commonly known technique (cf. Electronics and Communications in Japan (ECJ) 49 (1966) 11, 165) for dealing with variations in line delay times is to employ as a pulse train corresponding to the line bit clock pulse or exchange bit clock pulse a pulse frame whose pulse repetition frequency is a submultiple of the bit clock frequency. This is carried out such (cf. ECJ 49(1966) 11, 167) that a pulse generated by a pulse frame detector is fed into a bistable circuit performing the phase comparison in a particular phase of the first time slot of each pulse frame of the incoming TDM trunk and a pulse in a particular phase of the mean time slot of each pulse frame of the switching center concerned. It may further be carried out such (cf. Nachrichtentechnische Zeitschrift (NTZ) (1970)5, 257–261) that in the individual switching centers of a PCM telecommunication network line bit clock pulses are obtained, with the aid of the oscillatory circuits, from the incoming PCM/TDM trunks. The phase shifts of the line bit clock pulses referred to the exchange bit clock pulses of the switching center concerned cause the control of the clock oscillators supplying the exchange bit clock pulse. The line bit clock pulse and exchange bit clock pulse are fed into two frequency dividers which start the frequency division. It is preferable that the line bit clock pulses and exchange bit clock pulses be displaced from one another by 180° prior to frequency division. A phase comparison is then carried out between the frequency divider outputs by means of a bistable circuit. The DC mean value of the output signal of the bistable circuit is proportional to the phase difference and, thus, to the integral of a frequency difference, i.e., the difference between line clock frequency and exchange clock frequency. The output signals of all the bistable circuits allocated to individual lines are added via (generally identical) resistors for producing the mean value and smoothed by means of an RC network. The latter smoothed voltage varies the clock frequency of the exchange clock oscillator over a silicon or varactor diode.

The resetting edge of the exchange clock pulse for the frequency divider acts on the count inputs of the individual bistable circuits allocated to the two bistable circuit fields. If a line clock pulse fails, the associated bistable circuit runs as a counter having a duty cycle ratio of 1:1, thereby yielding a control voltage corresponding to an agreement between line clock frequency and exchange clock frequency. The oscillator frequency which is set when all the bistable circuits have a duty-cycle ratio of 1:1 is termed oscillator no-load frequency or clock frequency of the non-controlled clock oscillator.

In connection with the 180° displacement referenced above, such a frequency-control range is aspired to and achieved (cf. ECJ 49(1966)11, 168) with the determination indicated above of the pulse repetition frequency of the pulse trains corresponding to the line bit clock pulse or exchange bit clock pulse. The control range is subject to the actual phase comparison in such a way that the bit clock frequency is a multiple of the pulse repetition frequency. Both through the specified frequency tolerances of the phase difference caused in the network nodes (switching centers or route regenerators) of the TDM telecommunication network of existing clock pulse oscillators and through the expected delay-time variations, phase differences between line clock pulses and exchange clock pulses in the ongoing control procedure caused on the TDM trunks interconnecting the network nodes are detected without requiring the control operating point to leave the area of a sawtooth-shaped phase comparison characteristic.

Two quantities are of interest for the statistical network condition: the departure of the final, radiated frequency common to all the network nodes from a predetermined normal frequency and the phase differences (also called absolute phase difference or phase distortion) between line clock pulse frame and exchange clock pulse frame; both depend on the frequency tolerances of the non-controlled clock pulse oscillators, i.e., of the frequency differences between no-load frequency and nominal frequency, and on the variations in the line delay times. The influence of these two reference variables on the system is likewise determined by the response characteristic provided by the quotient of (caused) clock frequency variation and (causing) phase difference (cf. Nachrichtentechnische Fachberichte (NTF) 42(1972), 311–319, 314). The final, radiated frequency or the departure thereof from the nominal frequency is determined by two components, i.e., by a first component which, regardless of response characteristic, depends on the frequency drifts of the non-controlled oscillators from the nominal frequency, and by a second component which is proportional to the response characteristic and to fluctuations in the delay times. The absolute phase difference is likewise determined by two components, i.e., by a first component, which is proportional to the frequency drifts of the non-controlled oscillators from the nominal frequency and inversely proportional to the response characteristic, and by a second component which is only determined by the delay time variations independently of the response characteristic.

If it is desired to minimize the influence exerted by line delay time variations on the clock frequency, this may be achieved by selecting an appropriately small response characteristic. However, large absolute phase differences may result from the stabilizing of frequency variations. Such large absolute phase differences, particularly in the case of chain-like networks may be caused if, for reasons or compatibility with asynchronous telecommunication networks, a high degree of frequency accuracy must be had. However, such large absolute phase differences between link clock pulse frame and exchange clock pulse frame require, particularly in the case of synchronization of superordinate systems, i.e., systems having multiplied clock frequencies, appropriate buffer storage capacities in the individual switching centers of the PCM telecommunication network to avoid loss of information. This has been found to be undesirable in practice even though, in principle, this might be insignificant in the presence of pulse frame storages receiving a full pulse frame at the end of the individual incoming PCM/TDM trunks.

The difficulties mentioned hereinabove are obviated by a circuit arrangement of known construction for the mutual synchronization of the exchange clock pulse oscillators provided in the network nodes of a TDM telecommunication network, (See U.S. Pat. No. 3,869,579). In the latter arrangement there is provided in each network node an exchange-clock frequency divider energized from the exchange clock pulse and trunk-clock frequency dividers energized from the trunk clock pulses provided on the TDM trunks coming in the network node, whereby the trunk-clock frequency dividers, after a possible reference phase regeneration, operate with a displacement in time of about 180° in relation to the exchange-clock frequency divider. The output signals from the individual trunk-clock frequency dividers are transferred in conjunction with the output signal of the exchange-clock frequency divider to phase discriminators allocated to individual lines. The output signals of said phase discriminators are combined in a sum or mean value building element forming the control signal for the frequency control of the exchange-clock oscillator within its frequency control range.

In this prior art circuit arrangement, in addition to a first synchronizing circuit comprising exchange-clock and trunk-clock frequency dividers, phase discriminators, and a sum or mean value producing element with a control range quantity corresponding to the phase difference caused by the maximum occurring no-load frequency difference of the clock oscillators of two network nodes, whereby a reference phase regeneration commences if the control range quantity is exceeded, there is provided an appropriate second synchronizing circuit having exchange-clock and trunk-clock frequency dividers and phase discriminators with a region of operation corresponding to the phase difference provided by the sum of the aforementioned phase difference and the maximum delay time oscillation on a TDM trunk connecting two network nodes. By this means, the second synchronizing circuit subordinates an additional signal to the control signal supplied by the first synchronizing circuit. In the case of a positive difference between the exchange-clock phase and the mean trunk-clock phase, or in the case of a positive difference between the exchange-clock phase and the phase of at least one trunk clock exceeding a predetermined limit value, this additional signal defines at least one frequency control range lying under the oscillator no-load frequency. In the case of a negative difference between the exchange-clock phase and the mean trunk-clock phase, or in the case of a negative difference of less than a predetermined limit value between the exchange-dock phase and the phase of at least one trunk signal, the additional signal defines at least one frequency control range lying above the oscillator no-load frequency, the frequency of the exchange-clock oscillator in the frequency control range being controlled by the control signal supplied by the first synchronizing circuit.

The above described circuit arrangement which is based on the principle of gradual introduction of phase shifts of suitable direction in cooperation with reference phase regenerations brought about selectively and by defined frequency-control-range shifts in a network node, by which relatively large phase differences between exchange-clock pulse frame and trunk-clock pulse frame may gradually be broken down or avoided altogether. It is capable of eliminating the influences of delay line variations on the final radiated clock frequency without the necessity of or reducing the response characteristic. In fact the response characteristic may be quite as large as is necessary to limit absolute phase differences due to drifts of the oscillator no-load frequencies from the nominal frequency without allowing phase shifts caused by delay time variations to affect the final radiated clock frequency.

However, as is generally known, the influences of delay time variations on the final radiated clock frequency may, in principle, likewise be removed by deliberately bringing about reference phase regenerations, because reference phase regenerations alone eliminate a phase difference between trunk clock and exchange clock caused by a preceding delay time variation for the phase comparison underlying the frequency control and, with it, also for the frequency control itself. They allow the continued existence of the variation of the absolute phase difference proportional to the delay time variation. Accordingly, reference phase regenerations likewise cause the removal of a comparison phase difference resulting from a no-load frequency difference and bringing about the frequency control and, with it, a momentary interruption of the frequency control procedure until a new reference phase difference has been built up as a result of the existing no-load frequency difference. The reactivated existing absolute phase difference is increased accordingly, thereby providing an absolute phase drift which is proportional to the reference phase difference brought about by the maximum no-load frequency difference and to the number of reference phase regenerations.

It is generally known (West German Pat. No. 2,149,911) that reference phase regenerations are initiated when predetermined phase difference limits are exceeded as a result of the phase comparison underlying the frequency control. Thus, the phase difference limits determine, in accordance with the response characteristic, the limits of the frequency control range for the exchange clock pulse oscillator concerned. With a given response characteristic, the frequency control signal obtainable in a network node, as a result of the addition of the individual phase comparator output signals and, accordingly, also the frequency control range, are a function of the number of phase comparators effectively allocated to individual lines. Thus, they are a function of the network configuration.

In principle, different frequency-control-range variables of the individual network nodes do not stand in the way of a common final radiated clock frequency, but allow a momentary excursion of the clock frequency of the exchange clock pulse oscillator from the limits of the frequency control range of the exchange clock oscillator of another network node. Thus, they are capable of slowing the buildup of the telecommunication network to a final radiated clock frequency, so that by that time in the network nodes there may be a strong increase in the absolute phase differences between trunk-clock pulse frames and exchange-clock pulse frames coupled with a loss of information. Thus, it is desirable that the individual network nodes have the same frequency control ranges, which can be achieved by adjusting the response characteristic or the phase-difference limits independently of the network configuration; this adjustment, however, stands in the way of the normally desired uniformity in dimensioning of the individual network nodes.

It is, therefore, an object of this invention to provide a method and apparatus of the mutual synchronization of exchange clock oscillators which avoids the foregoing problems.

SUMMARY OF THE INVENTION

The foregoing and other objects are achieved in a method and apparatus for the mutual synchronization of the exchange clock pulse oscillators provided in the network nodes of a TDM telecommunication network, whereby in each network node there are provided an exchange-clock frequency divider energized from the exchange clock, and trunk-clock frequency dividers energized from the trunk clocks. The trunk clock frequency dividers, after possible reference phase regeneration, operate with a displacement in time by about 180° in relation to the exchange-clock frequency divider. The output signals from the individual trunk-clock frequency dividers in conjunction with the output signal from the exchange-clock frequency divider are fed into phase discriminators allocated to individual lines. The output signals from the phase discriminators, combined over a sum or mean value producing element, form the control signal for the frequency control of the exchange clock pulse oscillator. A reference phase regeneration is initiated as a result of a frequency drift from the no-load frequency of the oscillator exceeding a limit value predetermined in accordance with the minimum number of phase comparators allocated to individual lines and active in a network node.

The invention has the advantage of obtaining the same frequency control ranges for the individual network nodes even in the case of a network-design-independent (and in this respect flexible) response characteristic and independently of a fairly large number of phase comparators and active in the respective network nodes exceeding the minimum number provided for the network nodes. Of particular convenience is the use of the number 1 as a minimum number so as to make the frequency-control-range variable fully independent of the number of TDM trunks leading to the individual network nodes and to make allowance for a conceivable network design wherein a PCM switching center is connected to only one appropriate adjacent PCM switching center over a PCM line section, while other PCM connections leading thereto are synchronized in the master-slave mode.

The reference phase regeneration may be initiated in a further development of the invention with a limit value for the frequency drift from the oscillator no-load frequency wherein the frequency drift from the predetermined nominal frequency is larger than the drift of the oscillator no-load frequency from the nominal frequency. In this case, the availability of a final radiated clock frequency shared by all the network nodes is provided in every case. In order to ensure the avoidance of fairly large absolute phase differences and absolute phase drifts, it may be convenient to initiate the reference phase regeneration in the case of a limit value for the frequency drift from the oscillator no-load frequency wherein the frequency drift from the predetermined nominal frequency is larger than, e.g., twice the drift of the oscillator no-load frequency from the nominal frequency.

In another development of the invention, the reference phase regeneration may be initiated in the case of a limit value for the frequency drift from the oscillator no-load frequency wherein the frequency drift from the predetermined nominal frequency is equal to or smaller than the sum of the drift of the oscillator no-load frequency from the nominal frequency and the product of the minimum number of phase discriminators, the response characteristic, and the phase-difference limit associated with the maximum output signal of a phase comparator. Thus, it is ensured that with unidirectional interoperation of no more than the minimum number (preferably 1) of phase comparators a reference phase regeneration can be initiated. To ensure the avoidance of fairly large absolute phase differences and absolute phase drifts it may be convenient to initiate the reference phase regeneration with a limit value for the frequency drift from the oscillator no-load frequency wherein the frequency drift from the predetermined nominal frequency is larger than the sum of the above mentioned drift and, e.g., one-twentieth of the product referenced above.

Conveniently, the reference phase regeneration is initiated for all the phase comparators of the network node concerned, but is likewise possible to initiate the reference phase regeneration only in some of the phase comparators in that network node, i.e., in the phase comparators for which there are additional resetting criteria, e.g., relative to the magnitude of the occurring phase difference.

According to an advantageous further development of the invention, a reference phase regeneration is likewise initiated if a predetermined phase-difference limit is exceeded as a result of the phase comparison underlying the frequency control, i.e., only in the phase comparator wherein the phase-difference limit is exceeded if only a weak effect of the rest of the telecommunication network is desired. Reference phase regeneration is initiated in all phase comparators of the network node if the goal is a maximum rapid buildup of the telecommunication network toward the final radiated clock frequency.

The method according to the invention can advantageously be carried out by means of a circuit arrangement wherein a threshold circuit is linked to the output of the sum or mean value producing element carrying the control signal for the frequency control of the exchange clock pulse oscillator. The output of the latter oscillator is connected to the reset inputs of the trunk-clock frequency dividers. In this case, the threshold circuit conveniently has a response level determined in accordance with the minimum number of phase comparators operative in a network node and which can be accessed by a control signal coming from the minimum number of phase comparators.

In a further development of the invention, between the threshold-value switch and the reset inputs of the trunk-clock frequency dividers a bistable circuit may be inserted whose reset input is connected to an output of the exchange-clock frequency divider displaced by half the length of the frequency divider in relation to the outputs of the trunk-clock frequency dividers.

BRIEF DESCRIPTION OF THE DRAWING

The principles of the invention will be more readily understood by reference to the description of a preferred embodiment given hereinbelow in conjunction with the accompanying single FIGURE drawing, which is a schematic diagram of a synchronizing circuit constructed according to the invention and operating according to the inventive phase-averaging principle.

DETAILED DESCRIPTION OF THE DRAWING

The circuit arrangement in the FIGURE is included, for example, in a switching center of a PCM/TDM telecommunication network having a plurality of such switching centers.

The illustrated embodiment includes an oscillator O which according to the phase-averaging principle is synchronized with clock signals from oscillators in other switching centers. The clock signals from other switching centers are received over TDM trunks I . . . L coming from said other switching centers in accordance with the principles set forth in West German Auslegeschrift No. 1591593 and NTZ 21(1968)9, FIG. 2 and 534, FIG. 3, and NTZ 23(1970)5, 257, FIG. 1 (the latter two publications in pertinent part are in the English language). The trunk clock pulses originating in the oscillators provided in the other appropriately constructed switching centers are collected from the incoming TDM trunks I . . . L, which are, as well, used for the transmission of communication signals, by means of clock pulse receivers S. These clock pulse receivers, preferably, have a clock generator and a phase discriminator controlling the clock generator. The phase discriminator is used for combining the signal elements "1" occurring on an incoming TDM trunk with the generator clock pulse and with the inverted generator clock pulse. It controls with connecting signals the charging or discharging of a capacitor, from where the timing phase of the clock generator is thereafter readjusted in relation to the mean phase position of the received PCM signal elements.

The trunk clock pulses thus obtained travel to the trunk-clock frequency dividers ZI . . . ZL, to whose outputs phase comparators in the form of bistable circuits KI . . . KL, one of which allocated to each line, are connected, with an input allocated to a bistable circuit field. Moreover, the bistable circuits KI . . . KL are each connected to the output of an exchange-clock frequency divider ZO subsequent to the exchange clock pulse oscillator O, with a count input allocated to both bistable circuit fields. The DC mean value of the output signal of each bistable circuit KI . . . KL is thus (in a periodic function) proportional to the phase difference between the trunk clock pulse and the output of oscillator O. The DC mean value originates in such a minimum number of phase comparators KI . . . KL and is capable of reaching the response level of the threshold circuit FG. Preferably, a minimum number $n=1$ is a prerequisite condition.

The output signals from the bistable circuits KI . . . KL are combined with the subsequent low-pass filter TP over a summing network composed of resistors RI . . . RL. The output signal from the low-pass filter TP produces the signal to be fed into the control input of the exchange clock pulse oscillator O, whose frequency is to be controlled. Frequency control is effected by using the low pass filter output signal to control a varactor, or the like, according to the prior art technique discussed hereinabove.

The trunk clock frequency dividers ZI . . . ZL operate in a manner in itself known to effect a reference phase regeneration, each being displaced in time by about 180° relative to the exchange-clock frequency divider ZO. To initiate such reference phase regenerations, threshold circuit FG is connected to the output of low-pass filter TP coupling the control signal for frequency control to the exchange clock pulse oscillator O. The output of the threshold circuit is connected to the reset inputs of the trunk clock frequency dividers ZI . . . ZL. The connection includes a bistable circuit RN inserted between the threshold circuit FG and the reset inputs of the trunk-clock frequency dividers ZI . . . ZL; the reset input of the bistable circuit RN is connected to a central output $m/2$ of the exchange clock frequency divider ZO.

In the illustrated embodiment, the exchange-clock frequency divider ZO is constructed as a counter having a counting volume $m$ and a central output $m/2$ in addition to the output $m$ which is activated after the $m^{th}$ counting pulse is reached. The central output $m/2$ is activated in the course of a counting procedure during the $(m/2)^{th}$ counting pulse.

Threshold circuits of the type discussed herein having to response levels are old in the art; they are, for example, disclosed in U.S. Pat. No. 3,258,758 of U.S. Pat. No. 3,346,846. The response level of the threshold circuit FG is defined in accordance with the minimum number $n$ of phase comparators KI . . . KL allocated to individual lines and operative in a network node, so that, where necessary, a control signal for the exchange clock pulse oscillator O coming from a single phase comparator K is capable of reaching the response level of the threshold circuit FG. The threshold circuit FG has two differential amplifiers combined over an OR element at its output and is energized at its input from the control signal, and furthermore, has a bias voltage defining the low response level or a bias voltage defining the upper response level. The threshold circuit responds according to a response characteristic variable corresponding to a drift of the momentary clock frequency of the exchange clock pulse oscillator O from the oscillator no-load frequency. The frequency drift $w_u$ from the predetermined nominal frequency $f_o$ is equal to (or smaller than) the sum of the drift $w_0$ of the oscillator no-load frequency $f_0$ from the nominal frequency $f_o$ and the product of the minimum number $n$ of phase comparators, the response characteristic $\sigma$ and the phase-difference limit value $b_u$ associated with the maximum output signals of a phase comparator, preferably equal to (or smaller than) the sum of the drift of the oscillator no-load frequency from the nominal frequency and the product of the response characteristic and the phase-difference limit value associated with the maximum output signal of a phase comparator. At the same time, the frequency drift $w_u$ from the predetermined nominal frequency $f_o$ shall be larger than (or equal to) the above mentioned drift $w_0$ of the oscillator no-load frequency $f_0$ from the nominal frequency $f_o$, so that the relationship $$w_0| < |w_u| \leq |w_o + n.\sigma.b_u$$

is met.

The response of the threshold circuit FG initiated by a control signal of appropriately large amplitude fed into the exchange clock pulse oscillator O results in the activation of the bistable circuit RN subsequent to the threshold circuit FG. The bistable circuit RN sends over its output a reset signal to the reset inputs of the trunk-clock frequency dividers ZI . . . ZL, so that the trunk-clock frequency dividers ZI . . . ZL are reset to their initial state, in which they remain for the duration of the transmission of the reset signal. This lasts until the bistable circuit RN is reset, which in the cirucit arrangement shown in the drawing occurs by applying a reset signal from the count output $m/2$ of the exchange-clock frequency divider ZO. The trunk-clock frequency dividers ZI . . . ZL now begin, with a time displacement of 180° in relation to the exchange-clock frequency divider ZO, with a new frequency dividing process by which a reference phase regeneration is brought about for all the phase comparators KI . . . KL.

In addition to reference phase regenerations initiated with a frequency drift from the oscillator no-load frequency exceeding a predetermined limit value in accordance with the minimum number of phase comparators operative in a network node, a reference phase regeneration is also initiated in the circuit arrangement shown in the drawing whenever a predetermined phase-difference limit value $b_a$ is exceeded as a result of the phase comparison underlying the frequency control, by which at the same time the maximum output signal of a phase comparator is connected. To control such an additional reference phase regeneration which in the circuit arrangement illustrated in the drawing is only initiated in the phase comparator in which the phase-difference limit is exceeded, the synchronizing circuit depicted in the drawing has an appropriate control equipment RS.

In the drawing it is shown that the control equipment RS contains a bistable circuit RB which is connected by its two inputs to two outputs $m-r$ and $r$ of the exchange clock frequency divider ZO, which outputs correspond to the phase-difference limit values. The interval between the $(m-r)^{th}$ or the $r^{th}$ counting pulse and the $(m/2)^{th}$ counting pulse makes allowance for the phase difference caused by the maximum occurring no-load frequency of the clock pulse oscillators of two network nodes of the TDM telecommunication network. Further, it makes allowance for delay time variations $z$ on a line connecting two network nodes to satisfy the condition:

$$2 \cdot b_a = (m - r - r) \geq \frac{|f_\mu - f_\gamma|}{\sigma} \max + \hat{z},$$

where $|f_\mu - f_\gamma|_{max} = |w_{o\mu} - w_{o\gamma}|_{max}$ stands for the maximum occurring difference between the no-load frequencies of the clock oscillators of two network nodes, $\sigma$ the response characteristic and $\hat{z}$ the effects of the delay time variations still to be received by the phase comparator. A reference phase regeneration sets in when the phase-difference limit provided by the $r^{th}$ or the $(m-r)^{th}$ counting phase is exceeded. Outside of the limits the bistable circuit RB is activated, so that an AND element RU connected to its output is conditioned for the coincidence case. The output of the trunk-clock frequency divider ZL, which may likewise be constructed as a counter having an appropriate counting volume, leads to the other input of the AND element RU. If, during a frequency dividing process, the trunk-clock frequency divider ZL reaches the last counting pulse before the exchange-clock frequency divider ZO reaches the $r^{th}$ counting pulse, during its ongoing frequency-dividing process or after it has reached the $(m-r)^{th}$ counting pulse, the coincidence condition for the AND element RU is met. This leads to activation of a bistable circuit RP subsequent thereto. The bistable circuit RP sends over the output thereof a reset signal to the reset input of the trunk-clock frequency divider ZL so that the trunk-clock frequency divider ZL is reset to its initial condition; it remains in that condition for the duration of the transmission of the reset signal. This remains so until the bistable circuit RP is reset, which in the circuit arrangement shown in the drawing takes place by transferring a reset signal from the count output $m/2$ of the exchange-clock frequency divider ZO.

The trunk-clock frequency divider ZL then starts with a 180° time displacement relative to the exchange-clock frequency divider ZO, with a new frequency-dividing process, by which the reference phase regeneration is initiated for the phase comparator KL only.

Finally, it must be recognized that the circuit arrangement shown in the drawing may, without changing its mode of operation, be modified such that the lines connected in the drawings to the central output $m/2$ of the exchange-clock frequency divider ZO are, instead, connected to its output $m$, while at the same time the lines connected to the outputs $(m)$ of the trunk-clock frequency dividers ZI . . . ZL are, instead, connected to the central outputs to be provided thereat. Furthermore, the bistable circuit RP may likewise be combined with the bistable circuit RP to form a bistable circuit, before the input of which is inserted an OR element connected to the exchange-clock frequency divider ZO and to the threshold circuit FG, and which at the output end leads directly to the rest input of the associated trunk-clock frequency divider ZL.

The description given hereinabove is of a preferred embodiment constructed to operate according to the principles of the invention. It is contemplated that the described embodiment can be modified or changed, as can its operating characteristics, in a variety of ways while remaining with the scope of the appended claims.

We claim:

1. In a time division multiplex (TDM) telecommunication network wherein each exchange installation therein includes a clock oscillator, a method for synchronizing that clock oscillator with clock oscillator signals received on incoming trunks from other exchanges in the network, comprising the steps of:
    dividing the output frequency of said clock oscillator,
    dividing the frequencies received on said incoming trunks producing an output phase displaced from said divided clock oscillator output by 180° using reference phase regeneration,
    initiating said reference phase regeneration when said clock oscillator frequency drifts from the no-load frequency by an amount exceeding a predetermined limit value which is attainable with the minimum number of phase comparators used in any said exchange installation, which limit value is independent of the total number of phase comparators used in any said exchange installation,
    comparing the phase of said clock oscillator signal individually with the phase of each said clock oscillator signal on said incoming trunks by means of phase discriminators, one of which is assigned to each incoming trunk,
    producing a control signal which corresponds to one of the sum or mean value of the outputs of said phase discriminators and
    adjusting the frequency of said clock signal in accordance with the value of said control signal.

2. The method defined in claim 1 wherein said initiating step occurs in the case of a limit value for the frequency drift from the oscillator no-load frequency where the frequency drift from a predetermined nominal frequency is greater than the drift of the oscillator no-load frequency from the nominal frequency.

3. The method defined in claim 1 wherein said initiating step occurs in the case of a limit value for the frequency drift from the no-load frequency where the frequency drift from the predetermined nominal frequency is equal to or smaller than the sum of the amount of drift of the oscillator no-load frequency from the nominal frequency and the product of the minimum number of phase comparators, the response characteristic and the phase difference limit value associated with the maximum output signal of a phase comparator.

4. The method defined in claim 3 wherein said initiating step occurs for all of said phase discriminators.

5. The method defined in claim 3 wherein said initiating step occurs only in a predetermined number, less than all, of said phase discriminators.

6. The method defined in claim 3 wherein said initiating step occurs in the case of the exceeding of a limit value for the frequency drift from the oscillator no-load frequency in which the frequency drift from a predetermined nominal frequency is equal to or smaller than the sum of the amount of drift of the oscillator no-load frequency from the nominal frequency and the product of the response characteristic and the phase difference limit value associated with the maximum output signal of a phase discriminator.

7. In a time division multiplex (TDM) telecommunication network wherein each exchange installation therein includes a clock oscillator, apparatus for synchronizing said clock oscillator with clock oscillator signals received on incoming trunks from other exchanges in the network comprising:

first frequency divider means for dividing the output frequency of said clock oscillator down to an output signal of a predetermined frequency, second frequency means for receiving the clock signals on said incoming trunks and for producing divided frequency output signals phase displaced from said first frequency divider output signals by 180°, after reference phase regeneration, phase comparison means for comparing the phase of said first frequency divider output signal with each of said divided frequency output signals and for producing output signals having values corresponding to the results of said comparisons, summing means for producing a control signal corresponding to the mean value of said phase comparison means output signals, threshold circuit means for resetting said second frequency divider means responsive to a predetermined value of said control signal and means in said clock oscillator for adjusting the frequency thereof responsive to the value of said control signal.

8. The apparatus defined in claim 7 further comprising bistable circuit means for producing a reset output signal coupled to reset inputs of said second frequency divider means and having one input connected to the output of said threshold circuit means, another input, functioning as a reset input, connected to said first frequency divider means at a point thereon which is displaced by half the length of said first frequency divider relative to outputs of said second frequency divider means.

9. The apparatus defined in claim 7 wherein said phase comparison means comprises a plurality of phase comparators, one for each said incoming trunk, and wherein said predetermined value of said control signal is that which is attainable with the minimum number of phase comparators operative in the exchange installation.

10. The apparatus defined in claim 9 wherein said predetermined value of control signal is equal to the output of one of said phase comparators.

* * * * *